(12) United States Patent
Dong et al.

(10) Patent No.: US 10,491,606 B2
(45) Date of Patent: Nov. 26, 2019

(54) METHOD AND APPARATUS FOR PROVIDING WEBSITE AUTHENTICATION DATA FOR SEARCH ENGINE

(71) Applicant: BAIDU ONLINE NETWORK TECHNOLOGY (BEIJING) CO., LTD., Beijing (CN)

(72) Inventors: Changyang Dong, Beijing (CN); Zhenping Zhang, Beijing (CN); Yan Cui, Beijing (CN); Zheng Zhang, Beijing (CN); Qi Zhou, Beijing (CN); Jing Tan, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 208 days.

(21) Appl. No.: 15/531,070

(22) PCT Filed: Sep. 25, 2015

(86) PCT No.: PCT/CN2015/090781
§ 371 (c)(1),
(2) Date: May 26, 2017

(87) PCT Pub. No.: WO2016/082616
PCT Pub. Date: Jun. 2, 2016

(65) Prior Publication Data
US 2018/0337930 A1 Nov. 22, 2018

(30) Foreign Application Priority Data
Nov. 27, 2014 (CN) .......................... 2014 1 0706699

(51) Int. Cl.
*H04L 29/06* (2006.01)
*G06F 16/951* (2019.01)
(Continued)

(52) U.S. Cl.
CPC .......... *H04L 63/123* (2013.01); *G06F 16/951* (2019.01); *G06F 21/44* (2013.01); *H04L 63/08* (2013.01); *G06F 21/6227* (2013.01)

(58) Field of Classification Search
None
See application file for complete search history.

(56) References Cited

U.S. PATENT DOCUMENTS

2005/0027685 A1\* 2/2005 Kamvar ................ G06F 16/951
2008/0022013 A1 1/2008 Adelman
(Continued)

FOREIGN PATENT DOCUMENTS

CN 101079124 A 11/2007
CN 101127101 A 2/2008
(Continued)

OTHER PUBLICATIONS

Brin, S et al., "The Anatomy of a Large-Scale Hypertextual Web Search Engine," 1-15 Computer Networks and ISDN Systems, North Holland Publishing, Amsterdam, NL, vol. 30., No. 1-7, Apr. 1, 1998, pp. 107-117 (12 pages).
(Continued)

*Primary Examiner* — Malcolm Cribbs
(74) *Attorney, Agent, or Firm* — Nixon Peabody LLP

(57) ABSTRACT

The present disclosure provides a method and apparatus for providing website authentication data for a search engine, the method comprising: receiving website authentication data from a plurality of authentication data sources; storing the website authentication data; and transmitting the stored website authentication data to the search engine when a request from the search engine for retrieving the website authentication data is received. By virtue of the method, the
(Continued)

search engine may quickly retrieve complete website authentication data, thereby facilitating the search engine's search speed.

7 Claims, 3 Drawing Sheets

(51) Int. Cl.
*G06F 21/44* (2013.01)
*G06F 21/62* (2013.01)

(56) References Cited

U.S. PATENT DOCUMENTS

| | | | |
|---|---|---|---|
| 2008/0046412 A1* | 2/2008 | Lee | G06Q 10/10 |
| 2010/0057702 A1* | 3/2010 | Ghosh | G06F 16/2465 |
| | | | 707/E17.135 |
| 2011/0055248 A1* | 3/2011 | Consuegra | G06F 16/951 |
| | | | 707/769 |
| 2012/0047120 A1* | 2/2012 | Connolly | G06Q 30/02 |
| | | | 707/706 |
| 2013/0031464 A1* | 1/2013 | Mess | G06F 17/218 |
| | | | 715/234 |
| 2015/0113019 A1* | 4/2015 | Jiang | G06F 16/95 |
| | | | 707/709 |
| 2016/0048526 A1* | 2/2016 | Zhu | H04L 63/1483 |
| | | | 715/240 |
| 2016/0275190 A1* | 9/2016 | Seed | H04W 4/70 |

FOREIGN PATENT DOCUMENTS

| | | |
|---|---|---|
| CN | 101169783 A | 4/2008 |
| CN | 101916283 A | 12/2010 |
| CN | 103179125 A | 6/2013 |
| CN | 103401835 A | 11/2013 |
| CN | 104503983 A | 4/2015 |

OTHER PUBLICATIONS

International Search Report for PCT/CN2015/090781 dated Dec. 18, 2015, 7 pages.
Written Opinion of the International Searching Authority for PCT/CN2015/090781 dated Dec. 18, 2015, 5 pages.

* cited by examiner

METHOD AND APPARATUS FOR PROVIDING WEBSITE AUTHENTICATION DATA FOR SEARCH ENGINE

CROSS REFERENCE OF RELATED APPLICATION

This application is a U.S. national stage under 35 U.S.C. § 371 of International Application No. PCT/CN2015/090781, filed on Sep. 25, 2015, which claims priority of Chinese Application No. 201410706699.3 filed on N Nov. 27, 2014, entitled "Method and Apparatus for Providing Website Authentication Data for Search Engine," the contents of which are incorporated here by reference.

FIELD OF THE INVENTION

The present disclosure relates to the field of computers, and more specifically to a method and apparatus for providing website authentication data for a search engine.

BACKGROUND OF THE INVENTION

When performing search using a search keyword entered by a user, a search engine needs to obtain authentication data linked to a corresponding search result so as to ensure trustworthiness of the search result. As shown in FIG. 6, the content in a box corresponding to "V2" is just part of website authentication data for the search result. Currently, because respective website authentication data are scattered in different traffics (e.g., Baidu Statistics, Baidu Koubei (Word-of-Mouth), Baidu Baike (Encyclopedia), etc.), when the search engine is searching the website authentication data, it has to search in different traffics based on URLs (Uniform Resource Locators) of search results. For example, it needs to search netizen comments data of a web site in the word-of-mouth authentication traffic, while search telephone authentication data of the website in a telephone authentication traffic. The authentication data obtained from searches in different traffics are likely repeated or not updated. Therefore, the existing approaches for a search engine to search website authentication data are rather inefficient, which affects the search engine in its search speed and the accuracy of authentication data.

SUMMARY OF THE INVENTION

One of the technical problems solved by the present disclosure is to quickly provide website authentication data scattered in a plurality of authentication data sources for a search engine so as to enhance the search engine's search speed.

An embodiment according to one aspect of the present invention provides a method for providing website authentication data for a search engine, comprising:
receiving website authentication data from a plurality of authentication data sources;
storing the website authentication data; and
transmitting the stored website authentication data to the search engine when a request from the search engine for retrieving the website authentication data is received.

Optionally, storing the website authentication data comprises:
directly storing the received website authentication data; or
reorganizing the website authentication data into a data structure facilitating the search engine to retrieve, and storing the reorganized website authentication data.

Optionally, reorganizing the website authentication data into a data structure facilitating the search engine to retrieve specifically comprises:
reorganizing the website authentication data to being indexed by uniform resource locators and/or user identifiers to retrieve relevant web site authentication data.

Optionally, reorganizing the website authentication data into a data structure facilitating the search engine to retrieve specifically comprises:
separating website authentication data indexed by uniform resource locators from data indexed by user identifiers, and merging the data indexed by same uniform resource locators; and
merging the data indexed by same user identifiers.

Optionally, the method further comprises:
filtering out duplicate website authentication data from the received website authentication data.

Optionally, storing the website authentication data further comprises:
storing update time of the website authentication data.

An embodiment according to another aspect of the present disclosure provides an apparatus for providing website authentication data for a search engine, comprising:
a receiving unit configured to receive website authentication data from a plurality of authentication data sources;
a storing unit configured to store the website authentication data; and
a transmitting unit configured to transmit the stored website authentication data to the search engine when a request from the search engine for retrieving the website authentication data is received.

Optionally, the storing unit comprises:
a reorganizing subunit configured to reorganize the website authentication data into a data structure facilitating the search engine to retrieve, and
a storing subunit configured to store the reorganized website authentication data.

Optionally, the reorganizing subunit is specifically configured to:
reorganize the website authentication data to being indexed by uniform resource locators and/or user identifiers to retrieve relevant website authentication data.

Optionally, the reorganizing subunit is specifically configured to:
separate website authentication data indexed by uniform resource locators from data indexed by user identifiers, and merge the data indexed by same uniform resource locators; and
merge the data indexed by same user identifiers.

Optionally, the apparatus further comprises:
a filtering unit configured to filter out duplicate website authentication data from the received website authentication data.

Optionally, the storing unit is further configured to:
store update time of the website authentication data.

In this embodiment, website authentication data from a plurality of authentication data sources may be received and stored together, such that when a request from a search engine for retrieving website authentication data is received, the stored website authentication data may be transmitted to the search engine. By virtue of this method, the search engine may quickly retrieve website authentication data scattered in the plurality of authentication data sources, which may facilitate the search engine's search speed.

Those skilled in the art will appreciate that although the detailed description below refers to the illustrated embodiments and the accompanying drawings, the present invention is not limited to these embodiments. Instead, the scope of the present disclosure is broad and intended to be limited only by the appended claims.

BRIEF DESCRIPTION OF THE ACCOMPANYING DRAWINGS

Other features, objectives, and advantages will become more apparent by reading detailed depictions of non-limiting embodiments with reference to the accompanying drawings.

Same or similar reference numerals in the drawings represent same or similar parts.

DETAILED DESCRIPTION OF THE PREFERRED EMBODIMENTS

Hereinafter, the present invention will be described in further detail with reference to the accompanying drawings.

Figure 1:
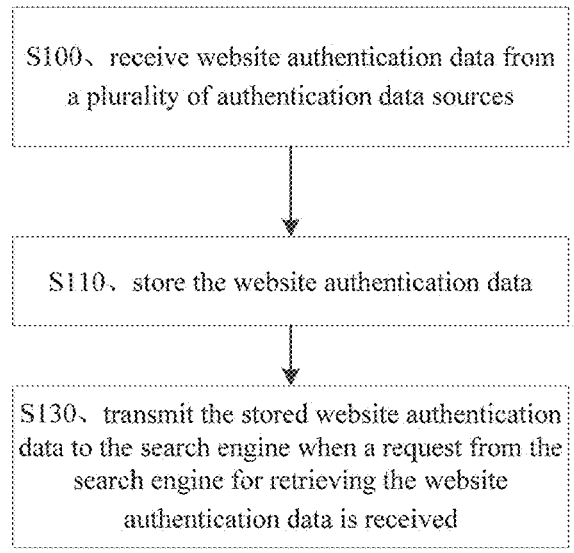
FIG. 1 is a flow diagram of a method for providing website authentication data for a search engine according to an embodiment of the present disclosure.

FIG. 1 is a flow diagram of a method for providing website authentication data for a search engine according to an embodiment of the present disclosure. The method in the present invention is mainly implemented through an operating system or a processing controller in a computer device. The operating system or processing controller is referred to as an apparatus for providing website authentication data for the search engine. The computer device includes, but not limited to, at least one of the following: a user equipment, a network device. The user equipment includes, but not limited to, a computer, a smart phone, a PDA, etc. The network device includes, but not limited to, a single network server, a server group consisting of a plurality of network servers, or a cloud consisting of a large number of computers or network servers based on cloud computing, the cloud computing is a kind of distributed computing and a super virtual computer consisting of a group of loosely coupled computer clusters.

As illustrated in FIG. 1, the method for providing website authentication data for a search engine according to this embodiment mainly comprises steps of:

S100: receiving website authentication data from a plurality of authentication data sources;

S110: storing the website authentication data; and

S130: transmitting the stored website authentication data to the search engine when a request from the search engine for retrieving the website authentication data is received.

Hereinafter, the steps will be further detailed, respectively.

In step S100, receiving website authentication data from a plurality of authentication data sources may refer to: receiving website authentication data voluntarily pushed by respective websites, or voluntarily acquiring website authentication data of respective websites.

Particularly, as to the scheme of receiving website authentication data voluntarily pushed by respective websites, in a specific implementation, the website authentication data may be received by providing an interface open to the respective websites. Providing an interface open to the respective websites refers to exposing interface information of the interface to the respective websites. The interface information includes at least one of the following: IP address of the interface, port number, port filename, and interface parameters exposed to the respective websites. The interface may be a remote process invoking interface based on HTTP (Hypertext Transfer Protocol), via which interface website authentication data of respective websites may be received. According to the scheme of receiving website authentication data voluntarily pushed by respective websites, when the websites update their website authentication data, the updated website authentication data may be timely received.

As to the scheme of voluntarily acquiring website authentication data of respective websites, an acquisition time period may be set, wherein it may be real-time acquisition or periodical acquisition.

Particularly, the received website authentication data may include different kinds of website authentication data of any website; of course, they may include all authentication data of a website. For example, they may include: name, scope of business, industry, ICP (Internet Content Provider) filing number of the website, among other relevant information of the company to which the website belongs. They may also include: word-of-mouth information such as netizens' comments on the website, etc. The different kinds of website authentication data as received may come from different traffics of an authenticating website, e.g., website authentication, official website authentication, telephone authentication, or word-of-mouth authentication, etc.

In this embodiment, the received website authentication data are mainly divided into two kinds. For example, they may include the following two kinds:

Voluntary Authentication Data:

Generally, a user registers an account with an authentication website, whereby a userid is generated. This kind of website authentication data refer to the authentication data filled in based on the userid, including at least one of the following: website address, ICP filing number of the website, and name, scope of business and industry of the company to which the website belongs, etc.; therefore, the organization form of this kind of website authentication data is that one userid corresponds to a plurality of authentication data. Because a situation exists that a plurality of websites share one userid, i.e., the userids of a plurality of websites are identical, it is possible that different website authentication data obtained from different websites correspond to a same userid.

Passive Authentication Data:

This kind of website authentication data refer to netizen's comments data regarding a website, including: comment content, number of comments, likes ratio, etc.

It should be noted that the plurality of authentication data sources may be different traffics that may provide website authentication data. For example, a telephone authentication service that may provide website telephone authentication data, or a word-of-mouth authentication service that may provide word-of-mouth related data. These different services may be located in a same website or located in different websites.

In step S110, the purpose of storing website authentication data is that when the search engine is to retrieve website authentication data, complete website authentication data may be quickly acquired from the storage device (e.g., a relational database), without a need of separately looking up respective traffics, which facilitates the speed of the search engine in retrieving the website authentication data.

When the website authentication data are stored, update time may be saved. For example, a timestamp may be added in an Authentication Content column of the corresponding website authentication data, such that the update time of the website authentication data may be identified based on the timestamp.

In addition, in order to avoid repetitively receiving website authentication data with the same content of the same website, duplicate website authentication data may be filtered out after receiving the website authentication data. In other words, this embodiment provides a network packet filtering mechanism, which, by comparing whether the contents in two adjacent website authentication packets of the same website are identical, determines whether they are duplicate website authentication data. Particularly, the filtering operation may be performed before storing the website authentication data after the website authentication data are received.

For example, for website authentication data from the same website, a MD5 (Message Digest Algorithm 5$^{th}$ Edition) value of the content in a website authentication data packet received each time is computed and recorded; the MD5 value of the content in the currently received website authentication data packet is compared with the MD5 value recorded in the last time; if identical, it indicates that the website authentication data of the website received at the two times are duplicate data; then, the website authentication data of the website received at the present time may be filtered out, e.g., discarding the website authentication data of the website received at the present time; if different, subsequent processing may be performed.

In step S120, when receiving a request from the search engine for retrieving the website authentication data, the stored website authentication data are transmitted to the search engine. In other words, when the search engine is performing a retrieving operation, it will retrieve website authentication data corresponding to the website using the URL and/or Userid of the retrieved website as the search keyword; then, based on the search keyword, complete website authentication data corresponding to the website may be quickly found from among the currently stored website authentication data.

According to the method of providing website authentication data for a search engine in this embodiment, the website authentication data from a plurality of authentication data sources in any website may be stored together, such that when a request from the search engine for retrieving website authentication data is received, the stored website authentication data may be transmitted to the search engine. By virtue of this method, the search engine may quickly retrieve the website authentication data scattered in the plurality of authentication data sources, which may facilitate the search engine's search speed.

Figure 2:
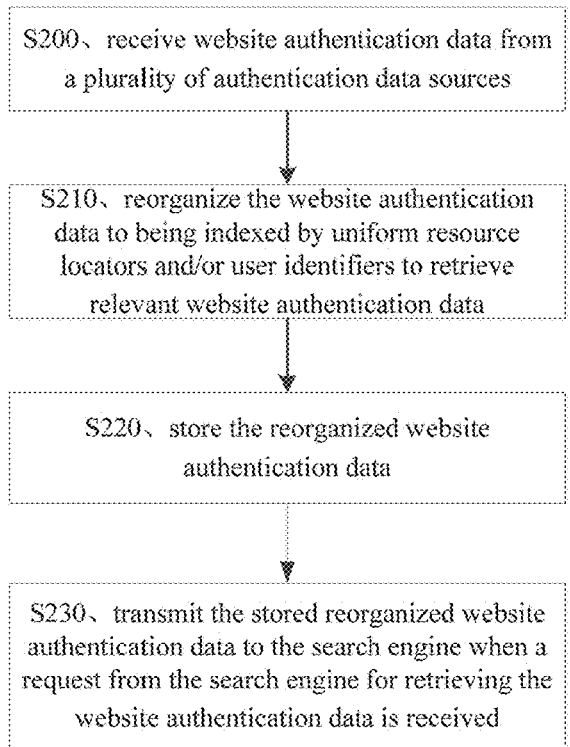
FIG. 2 is a flow diagram of a method for providing website authentication data for a search engine according to another embodiment of the present disclosure.

FIG. 2 is a flow diagram of a method for providing website authentication data for a search engine according to another embodiment of the present disclosure. The method mainly comprises steps of:

S200: receiving website authentication data from a plurality of authentication data sources;

S210: reorganizing the website authentication data into a data structure facilitating the search engine to retrieve, to obtain the reorganized web site authentication data;

S220: storing the reorganized website authentication data; and

S230: transmitting the stored reorganized web site authentication data to the search engine when a request from the search engine for retrieving the website authentication data is received.

Hereinafter, the steps will be further detailed, respectively.

In step S200, receiving website authentication data from a plurality of authentication data sources may refer to: receiving website authentication data voluntarily pushed by respective web sites, or voluntarily acquiring web site authentication data of respective websites.

Particularly, as to the scheme of receiving website authentication data voluntarily pushed by respective websites, in a specific implementation, the website authentication data may be received by providing an interface open to the respective websites. Providing an interface open to the respective websites refers to exposing interface information of the interface to the respective websites. The interface information includes at least one of the following: IP address of the interface, port number, port filename, and interface parameters exposed to the respective websites. The interface may be a remote process invoking interface based on HTTP (Hypertext Transfer Protocol), via which interface website authentication data of respective websites may be received. According to the scheme of receiving website authentication data voluntarily pushed by respective websites, when the websites update their website authentication data, the updated website authentication data may be timely received.

As to the scheme of voluntarily acquiring website authentication data of respective websites, an acquisition time period may be set, wherein it may be real-time acquisition or periodical acquisition.

Particularly, the received website authentication data may include different kinds of website authentication data of any website; of course, they may include all authentication data of a website. For example, they may include: name, scope of business, industry, ICP (Internet Content Provider) filing number of the website, among other relevant information of the company to which the website belongs. They may also include: word-of-mouth information such as netizens' comments on the website, etc. The different kinds of website authentication data as received may come from different traffics of an authenticating website, e.g., website authentication, official website authentication, telephone authentication, or word-of-mouth authentication, etc.

In this embodiment, the received website authentication data are mainly divided into two kinds. For example, they may include the following two kinds:

Voluntary Authentication Data:

Generally, a user registers an account with an authentication website, whereby a userid is generated. This kind of website authentication data refer to the authentication data filled in based on the userid, including at least one of the following: website address, ICP filing number of the website, and name, scope of business and industry of the company to which the website belongs, etc.; therefore, the organization form of this kind of website authentication data is that one userid corresponds to a plurality of authentication data. Because a situation exists that a plurality of websites share one userid, i.e., the userids of a plurality of websites are identical, it is possible that different website authentication data obtained from different websites correspond to a same userid.

Passive Authentication Data:

This kind of website authentication data refer to netizen's comments data regarding a website, including: comment content, number of comments, likes ratio, etc.

It should be noted that the plurality of authentication data sources may be different traffics that may provide website authentication data. For example, a telephone authentication service that may provide website telephone authentication data, or a word-of-mouth authentication service that may provide word-of-mouth related data. These different services may be located in a same website or located in different websites.

In addition, in order to avoid repetitively receive website authentication data with the same content of the same website, duplicate website authentication data may be filtered out after receiving the website authentication data. In other words, this embodiment provides a network packet filtering mechanism, which, by comparing whether the contents in two adjacent website authentication packets of the same website are identical, determines whether they are duplicate website authentication data.

For example, for website authentication data from the same website, a MD5 (Message Digest Algorithm $5^{th}$ Edition) value of the content in a website authentication data packet received each time is computed and recorded; the MD5 value of the content in the currently received website authentication data packet is compared with the MD5 value recorded in the last time; if identical, it indicates that the website authentication data of the website received at the two times are duplicate data; then, the website authentication data of the website received at the present time may be filtered out, e.g., discarding the website authentication data of the website received at the present time; if different, subsequent processing may be performed.

In step S210, the website authentication data are reorganized into a data structure facilitating the search engine to retrieve, obtaining reorganized website authentication data. The facilitating the search engine to retrieve refers to facilitating the search engine to quickly find the website authentication data scattered in a plurality of authentication data sources, without a need of looking up the plurality of authentication data and then acquiring.

Specifically, the website authentication data may be reorganized to being indexed by a URL (Uniform Resource Locator) and/or Userid to thereby retrieve relevant website authentication data, e.g., reorganized into a data structure of a key value pair with URL and/or Userid as keywords. In other words, the Userid and URL in the website authentication data and the corresponding authentication content may form a key value pair, facilitating the search engine to retrieve complete website authentication data of the website according to the URL and/or Userid.

Particularly, reorganizing the website authentication data into a data structure facilitating the search engine to retrieve may specifically comprise processing steps of:

First, separating website authentication data indexed by the URLs from data indexed by the Userids, and merging the data indexed by same uniform resource locators;

For example, for the two kinds of website authentication data mentioned above, the formed key value pairs may be respectively:

Userid→{(URL 1/URL 2/URL 3 . . . ), company related information}; and

URL→{word-of-mouth related information}.

The company related information therein includes, but not limited to, company name, ICP filing number of the website, official website authentication query, business scope of the company, the industry to which the company belongs, etc.; the word-of-mouth related information therein includes, but not limited to: comment content, number of comments, and likes ratio, etc.

The separating website authentication data indexed by the URLs from data indexed by the Userids refers to separating website authentication data indexed with URL 1/URL 2/URL 3 . . . from the key value pair Userid→{(URL 1/URL 2/URL 3 . . . ), company related information}. The result of separating is provided below:

URL1→{Userid, company related information}, URL2→{Userid, company related information}, URL3→{Userid, company related information} . . . ;

Supposing URL is identical to URL 1, then data indexed by the same URL will be merged, i.e., merging website authentication data corresponding to URL and URL 1. The result of merging is as follows:

URL→{word-of-mouse related information, company-related information}; and

URL2→{Userid, company-related information};

URL3→{Userid, company-related information} . . . .

Afterwards, data indexed with the same Userid are merged.

As previously mentioned, because a situation exists that different website authentication data acquired from different websites correspond to the same userid, website authentication data indexed by the same Userid may be merged. The merged result is Userid→{company related information}.

The website authentication data obtained from reorganizing the two key value pairs are as follows:

URL→{word-of-mouth related information, company related information}; and

URL2→{Userid, company related information};

URL3→{Userid, company related information} . . . ;

Userid→{company related information}.

It may be understood that because the website authentication data are possibly updated at any time, the reorganized key values may be subjected to corresponding modifications according to the updated website authentication data, including adding part of contents, e.g., adding a telephone authentication or an official website; or delete part of contents, e.g., deleting the official web site or a telephone authentication; or modifying part of contents, e.g., modifying word-of-mouth related information, etc.

In step S220, the purpose of storing the reorganized website authentication data is that when the search engine is to retrieve website authentication data, complete website authentication data may be quickly acquired from the storage device (e.g., a relational database), without a need of looking up website authentication data of the authentication website from among respective traffics, respectively, which facilitates the speed of the search engine in retrieving the website authentication data.

When the reorganized website authentication data are stored, one implementation manner may be establishing two tables, Userinfo and Urlinfo, for the key value pairs obtained after the reorganizing, where the Usrids and URLs are main keys, and the corresponding authentication contents are corresponding items.

In addition, update time may be saved when storing the reorganized website authentication data. For example, a timestamp may be added in an Authentication Content column of the Userinfo and Urlinfo tables, such that the update time of the website authentication data may be identified based on the timestamp.

In step S230, when receiving a request from the search engine for retrieving the website authentication data, the stored reorganized website authentication data are transmitted to the search engine. In other words, when the search engine is performing a retrieving operation, it will retrieve website authentication data corresponding to the web site with the URL and/or Userid of the retrieved web site as the search keywords; then, based on the search keyword, complete website authentication data corresponding to the website may be quickly found from among the currently stored website authentication data.

According to the method of providing website authentication data for a search engine in this embodiment, the website authentication data from a plurality of authentication data sources may be reorganized into a data structure facilitating the search engine to retrieve, and the reorganized website authentication data are stored, such that when a request from the search engine for retrieving website authentication data is received, the stored reorganized website authentication data may be transmitted to the search engine. By virtue of this method, the search engine may quickly retrieve complete reorganized website authentication data, which may facilitate the search engine's search speed.

Figure 3:
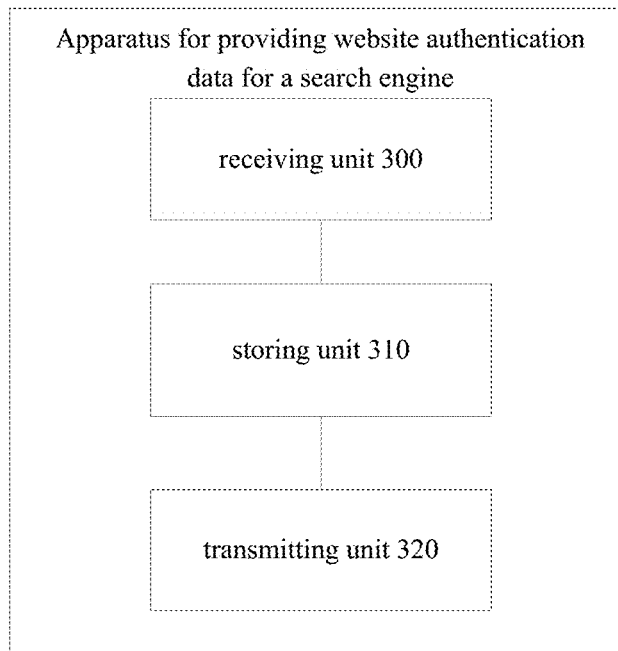
FIG. 3 is a structural diagram of an apparatus for providing website authentication data for a search engine according to an embodiment of the present disclosure.

What have been discussed above are methods of providing website authentication data for a search engine provided according to embodiments of the present application. Following the same thought as the methods above, an embodiment of the present application also provides an apparatus for providing website authentication data for a search engine, as shown in FIG. 3, the apparatus mainly comprising: a receiving unit 300, a storing unit 310, and a transmitting unit 320.

Particularly, the receiving unit 300 is mainly configured to receive website authentication data from a plurality of authentication data sources.

Specifically, receiving, by the receiving unit 300, website authentication data from a plurality of authentication data sources may refer to: receiving website authentication data voluntarily pushed by respective websites, or voluntarily acquiring website authentication data of respective websites.

Particularly, as to the scheme of receiving website authentication data voluntarily pushed by respective websites, in a specific implementation, the website authentication data may be received by providing an interface open to the respective websites. Providing an interface open to the respective websites refers to exposing interface information of the interface to the respective websites. The interface information includes at least one of the following: IP address of the interface, port number, port filename, and interface parameters exposed to the respective websites. The interface may be a remote process invoking interface based on HTTP (Hypertext Transfer Protocol), via which interface website authentication data of respective websites may be received. According to the scheme of receiving website authentication data voluntarily pushed by respective websites, when the websites update their website authentication data, the updated website authentication data may be timely received.

As to the scheme of voluntarily acquiring website authentication data of respective websites, an acquisition time period may be set, wherein it may be real-time acquisition or periodical acquisition.

Particularly, the received website authentication data may include different kinds of website authentication data of any website; of course, they may include all authentication data of a website. For example, they may include: name, scope of business, industry, ICP (Internet Content Provider) filing number of the website, among other relevant information of the company to which the website belongs. They may also include: word-of-mouth information such as netizens' comments on the website, etc. The different kinds of website authentication data as received may come from different traffics of an authenticating website, e.g., website authentication, official website authentication, telephone authentication, or word-of-mouth authentication, etc.

In this embodiment, the received web site authentication data are mainly divided into two kinds. For example, they may include the following two kinds:

Voluntary Authentication Data:

Generally, a user registers an account with an authentication website, whereby a userid is generated. This kind of website authentication data refer to the authentication data filled in based on the userid, including at least one of the following: website address, ICP filing number of the website, and name, scope of business and industry of the company to which the website belongs, etc.; therefore, the organization form of this kind of website authentication data is that one userid corresponds to a plurality of authentication data. Because a situation exists that a plurality of websites share one userid, i.e., the userids of a plurality of websites are identical, it is possible that different website authentication data obtained from different websites correspond to a same userid.

Passive Authentication Data:

This kind of website authentication data refer to netizen's comments data regarding a website, including: comment content, number of comments, likes ratio, etc.

It should be noted that the plurality of authentication data sources may be different traffics that may provide website authentication data. For example, a telephone authentication service that may provide website telephone authentication data, or a word-of-mouth authentication service that may provide word-of-mouth related data. These different services may be located in a same website or located in different websites.

Particularly, the storing unit 310 is mainly configured to store the website authentication data.

The purpose of storing website authentication data is that when the search engine is to retrieve website authentication data, website authentication data, which were originally scattered in a plurality of authentication data sources, may be quickly acquired from the storage device (e.g., a relational database), without a need of looking up the plurality of authentication data sources separately, which facilitates the speed of the search engine in retrieving the website authentication data.

In an embodiment, the storing unit 310 may directly store the website authentication data received by the receiving unit 300.

Figure 4:
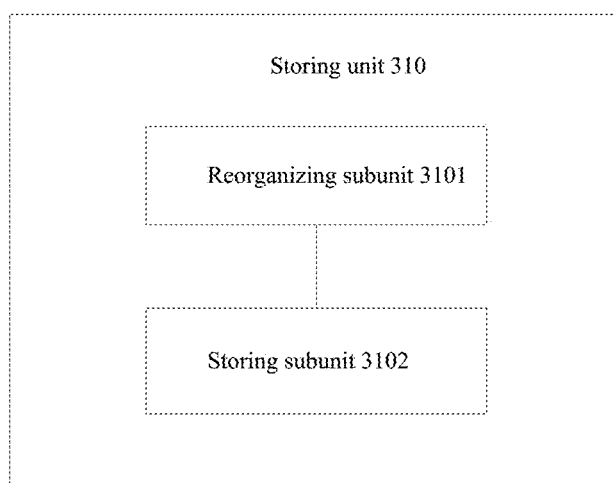
FIG. 4 is a structural diagram of a storage unit according to an embodiment of the present disclosure.

In another embodiment, as shown in FIG. 4, the storing unit 310 may further comprise the following subunits for storing the website authentication data: a reorganizing subunit 3101 and a storing subunit 3102.

The reorganizing subunit 3101 is configured to reorganize the website authentication data into a data structure facilitating the search engine to retrieve;

The reorganizing subunit 3101 reorganizes the website authentication data into a data structure facilitating the search engine to retrieve, obtaining reorganized website authentication data. The facilitating the search engine to retrieve refers to facilitating the search engine to quickly find the website authentication data scattered in a plurality of authentication data sources, without a need of looking up the plurality of authentication data and then acquiring.

Specifically, the reorganizing subunit 3101 may reorganize the website authentication data to being indexed by a URL (Uniform Resource Locator) and/or Userid to thereby retrieve relevant website authentication data, e.g., reorganized into a data structure of a key value pair using the URL and/or Userid as keywords. In other words, the Userid and URL in the website authentication data and the corresponding authentication content may form a key value pair, facilitating the search engine to retrieve complete website authentication data of the website according to the URL and/or Userid.

Particularly, reorganizing by the reorganizing subunit 3101 the website authentication data into a data structure facilitating the search engine to retrieve may specifically comprise operations below:

First, separating website authentication data indexed by the URLs from data indexed by the Userids, and merging the data indexed by same uniform resource locators;

For example, for the two kinds of website authentication data mentioned above, the formed key value pairs may be respectively:

Userid→{(URL 1/URL 2/URL 3 . . . ), company related information}; and

URL→{word-of-mouth related information}.

The company related information therein includes, but not limited to, company name, ICP filing number of the website, official website authentication query, business scope of the company, the industry to which the company belongs, etc.; the word-of-mouth related information therein includes, but not limited to: comment content, number of comments, and likes ratio, etc.

The separating website authentication data indexed by the URLs from data indexed by the Userids refers to separating website authentication data indexed with URL 1/URL 2/URL 3 . . . from the key value pair Userid→{(URL 1/URL 2/URL 3 . . . ), company related information}. The result of separating is provided below:

URL1→{Userid, company related information},
URL2→{Userid, company related information},
URL3→{Userid, company related information} . . . ;

Supposing URL is identical to URL 1, then data indexed by the same URL will be merged, i.e., merging website authentication data corresponding to URL and URL 1. The result of merging is as follows:

URL→{word-of-mouse related information, company-related information}; and

URL2→{Userid, company-related information};

URL3→{ Userid, company-related information} . . . .

Afterwards, data indexed with the same Userid are merged.

As previously mentioned, because a situation exists that different website authentication data acquired from different websites correspond to the same userid, website authentication data indexed by the same Userid may be merged. The merged result is Userid→{company related information}.

The website authentication data obtained from reorganizing the two key value pairs are as follows:

URL→{word-of-mouth related information, company related information}; and

URL2→{Userid, company related information};
URL3→{Userid, company related information} . . . ;
Userid→{company related information}.

It may be understood that because the website authentication data are possibly updated at any time, the reorganizing subunit 3101 may correspondingly modify the reorganized website authentication data according to the updated website authentication data, including adding part of contents, e.g., adding a telephone authentication or an official website; or delete part of contents, e.g., deleting the official website or a telephone authentication; or modifying part of contents, e.g., modifying word-of-mouth related information, etc.

Particularly, the storing subunit 3102 is configured to store reorganized website authentication data. When the storing subunit 3102 stores the reorganized website authentication data, one implementation manner may be establishing two tables, Userinfo and Urlinfo, for the key value pairs obtained after the reorganizing, where the Usrids and URLs are main keys, and the corresponding authentication contents are corresponding items.

In addition, the storing unit 310 in this embodiment may save update time when storing the website authentication data. For example, for the reorganized website authentication data, a timestamp may be added in an Authentication Content column of the Userinfo and Urlinfo tables, such that the update time of the website authentication data may be identified based on the timestamp.

Particularly, the transmitting unit 320 is mainly configured to transmit the stored website authentication data to the search engine when receiving a request from the search engine for retrieving the website authentication data. In other words, when the search engine is performing a retrieving operation, it will retrieve website authentication data corresponding to the website using the URL and/or Userid of the retrieved website as the search keywords; then, based on the search keywords, complete website authentication data corresponding to the website may be quickly found from among the currently stored website authentication data.

Figure 5:
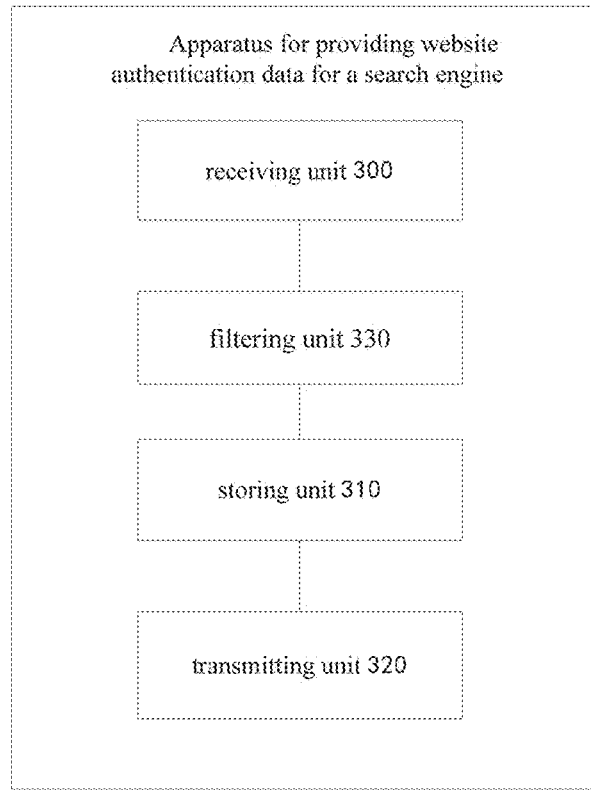
FIG. 5 is a structural diagram of an apparatus for providing website authentication data for a search engine according to another embodiment of the present disclosure.
Figure 6:
FIG. 6 is a schematic diagram of a search engine searching and displaying part of website authentication data in the background technology.

Optionally, as shown in FIG. 5, the apparatus in this embodiment may further comprise:

a filtering unit 330 is mainly configured to filter out duplicate website authentication data from among the received website authentication data.

In order to avoid repetitively receiving website authentication data with the same content of the same website, the filtering unit 330 filters out duplicate website authentication data after the receiving unit 330 receives the website authentication data. By comparing whether the contents in two adjacent website authentication packets of the same website are identical, it may be determined whether they are duplicate website authentication data.

For example, for website authentication data from the same website, a MD5 (Message Digest Algorithm $5^{th}$ Edition) value of the content in a website authentication data packet received each time is computed and recorded; the MD5 value of the content in the currently received website authentication data packet is compared with the MD5 value recorded in the last time; if identical, it indicates that the website authentication data of the website received at the two times are duplicate data; then, the web site authentication data of the web site received at the present time may be filtered out, e.g., discarding the website authentication data of the website received at the present time; if different, subsequent processing may be performed.

According to the apparatus of providing website authentication data for a search engine in this embodiment, the website authentication data from a plurality of authentication data sources in any website may be stored together, such that when a request from the search engine for retrieving website authentication data is received, the stored website authentication data may be transmitted to the search engine. By virtue of this method, the search engine may quickly retrieve website authentication data scattered in the plurality of authentication data sources, which may facilitate the search engine's search speed.

It should be noted that the present disclosure may be implemented in software and/or a combination of software and hardware. For example, each module of the present disclosure may be implemented by an application-specific integrated circuit (ASIC) or any other similar hardware device. In one embodiment, the software program of the present disclosure may be executed through a processor to implement the steps or functions as mentioned above. Likewise, the software program (including relevant data structure) of the present disclosure may be stored in a computer readable recording medium, e.g., RAM memory, magnetic or optic driver or soft floppy or similar devices. Additionally, some steps or functions of the present disclosure may be implemented by hardware, for example, a circuit cooperating with the processor so as to implement various steps or functions.

Further, a portion of the present disclosure may be applied as a computer program product, for example, a computer program instruction, which, when executed by the computer, may invoke or provide a method and/or technical solution according to the present disclosure through operations of the computer. Further, the program instruction invoking the method of the present disclosure may be stored in a fixed or mobile recording medium, and/or transmitted through broadcast or data flow in other signal bearer media, and/or stored in a working memory of a computer device which operates based on the program instruction. Here, in an embodiment according to the present disclosure, an apparatus comprises a memory for storing a computer program instruction and a processor for executing the program instruction, wherein when the computer program instruction is executed by the processor, the apparatus is triggered to run the methods and/or technical solutions according to a plurality of embodiments of the present disclosure.

To those skilled in the art, it is apparent that the present disclosure is not limited to the details of the above exemplary embodiments, and the present disclosure may be implemented with other embodiments without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise" does not exclude other units or steps, and singularity does not exclude plurality. A plurality of units or modules stated in a system claim may also be implemented by a single unit or module through software or hardware. Terms such as the first and the second are used to indicate names, but do not indicate any particular sequence.

The invention claimed is:

1. A method for providing website authentication data for a search engine, comprising:
  receiving website authentication data from a plurality of authentication data sources;
  reorganizing the website authentication data into a data structure facilitating the search engine to retrieve;
  storing the reorganized website authentication data; and
  transmitting the stored website authentication data to the search engine when a request from the search engine for retrieving the website authentication data is received;
  wherein the reorganizing the website authentication data into a data structure facilitating the search engine to retrieve comprises:
  separating website authentication data indexed by uniform resource locators from data indexed by user identifiers, and merging the data indexed by same uniform resource locators; and
  merging the data indexed by same user identifiers.

2. The method according to claim 1, further comprising:
  filtering out duplicate website authentication data from the received website authentication data.

3. The method according to claim 1, wherein storing the reorganized website authentication data further comprises:
  storing update time of the reorganized website authentication data.

4. An apparatus for providing website authentication data for a search engine, comprising:
  at least one processor; and
  a memory storing instructions, the instructions when executed by the at least one processor, cause the at least one processor to perform operations, the operations comprising:
  receiving website authentication data from a plurality of authentication data sources;
  reorganizing the website authentication data into a data structure facilitating the search engine to retrieve;
  storing the reorganized website authentication data; and
  transmitting the stored website authentication data to the search engine when a request from the search engine for retrieving the website authentication data is receive;
  wherein the reorganizing the website authentication data into a data structure facilitating the search engine to retrieve comprises:
  separating website authentication data indexed by uniform resource locators from data indexed by user identifiers, and merging the data indexed by same uniform resource locators; and
  merging the data indexed by same user identifiers.

5. The apparatus according to claim 4, the operations further comprising:
  filtering out duplicate website authentication data from the received website authentication data.

6. The apparatus according to claim 4, wherein storing the reorganized website authentication data further comprises:
  storing update time of the reorganized web site authentication data.

7. A non-transitory computer-readable storage medium storing a computer program, wherein the computer program, when executed by a processor, causes the processor to perform operations, the operations comprising:
  receiving website authentication data from a plurality of authentication data sources;
  reorganizing the website authentication data into a data structure facilitating the search engine to retrieve;
  storing the reorganized website authentication data; and
  transmitting the stored website authentication data to the search engine when a request from the search engine for retrieving the website authentication data is received;
  wherein the reorganizing the website authentication data into a data structure facilitating the search engine to retrieve comprises:

separating website authentication data indexed by uniform resource locators from data indexed by user identifiers, and merging the data indexed by same uniform resource locators; and merging the data indexed by same user identifiers.

* * * * *